United States Patent
Murayama et al.

(10) Patent No.: US 9,327,697 B2
(45) Date of Patent: May 3, 2016

(54) BRAKING DEVICE

(71) Applicants: HONDA MOTOR CO., LTD., Minato-Ku, Tokyo (JP); NISSIN KOGYO CO., LTD., Ueda-shi, Nagano (JP)

(72) Inventors: Kazuaki Murayama, Wako (JP); Jiro Suzuki, Wako (JP); Nobutake Hyodo, Wako (JP); Nobuyuki Kobayashi, Ueda (JP); Kouji Sakai, Ueda (JP)

(73) Assignees: Honda Motor Co., Ltd., Tokyo (JP); Nissin Kogyo Co., Ltd., Nagano (JP)

( * ) Notice: Subject to any disclaimer, the term of this patent is extended or adjusted under 35 U.S.C. 154(b) by 0 days.

(21) Appl. No.: 14/388,904

(22) PCT Filed: Mar. 29, 2013

(86) PCT No.: PCT/JP2013/059722
§ 371 (c)(1),
(2) Date: Sep. 29, 2014

(87) PCT Pub. No.: WO2013/147251
PCT Pub. Date: Oct. 3, 2013

(65) Prior Publication Data
US 2015/0061364 A1 Mar. 5, 2015

(30) Foreign Application Priority Data
Mar. 30, 2012 (JP) .................. 2012-083310

(51) Int. Cl.
*B60T 13/58* (2006.01)
*B60T 13/66* (2006.01)
(Continued)

(52) U.S. Cl.
CPC . *B60T 13/58* (2013.01); *B60T 8/38* (2013.01); *B60T 8/4081* (2013.01); *B60T 11/236* (2013.01);
(Continued)

(58) Field of Classification Search
CPC ............... B60T 8/17; B60T 8/40; B60T 8/42; B60T 8/48; B60T 8/74; B60T 8/172; B60T 8/368; B60T 13/58; B60T 13/142; B60T 13/145; B60T 13/161; B60T 13/586; B60T 13/745; B60T 17/08; B60T 17/18
See application file for complete search history.

(56) References Cited

U.S. PATENT DOCUMENTS 3,416,315 A    12/1968  Wortz
4,918,921 A *   4/1990  Leigh-Monstevens    B60T 13/745
                                              310/83

(Continued)

FOREIGN PATENT DOCUMENTS

CN    2149322 Y    12/1993
CN    2385938 Y     7/2000
(Continued)

OTHER PUBLICATIONS

Office Action dated Dec. 28, 2015 corresponding to Chinese Patent Application 201380017362.5.
(Continued)

*Primary Examiner* — Christopher Schwartz
(74) *Attorney, Agent, or Firm* — Carrier Blackman & Associates, P.C.; William D. Blackman; Joseph P. Carrier

(57) ABSTRACT

A first slave piston and a second slave piston are disposed in tandem in series within a cylinder body, and the pistons are arranged so that part of the shaft section of the second slave piston overlaps with the inner periphery of an opening section provided in the backward side, in the displacement direction, of the first slave piston. A long hole extending along the axial direction of the second slave piston is provided in the shaft section, and a connection pin which regulates the initial position of the second slave piston is inserted into the long hole.

11 Claims, 5 Drawing Sheets

(51) Int. Cl.
*B60T 13/68* (2006.01)
*B60T 13/74* (2006.01)
*B60T 8/38* (2006.01)
*B60T 8/40* (2006.01)
*B60T 13/14* (2006.01)
*B60T 11/236* (2006.01)

(52) U.S. Cl.
CPC ............ *B60T 13/142* (2013.01); *B60T 13/146* (2013.01); *B60T 13/662* (2013.01); *B60T 13/686* (2013.01); *B60T 13/745* (2013.01)

(56) References Cited

U.S. PATENT DOCUMENTS

| | | | | |
|---|---|---|---|---|
| 8,911,029 B2* | 12/2014 | Ohnishi | ................ | B60T 13/745 188/162 |
| 2012/0006017 A1 | 1/2012 | Klimes et al. | | |
| 2012/0161506 A1* | 6/2012 | Tanaka | ................ | B60T 13/745 303/14 |
| 2012/0248862 A1* | 10/2012 | Ohnishi | ................ | B60T 13/745 303/20 |
| 2013/0270895 A1* | 10/2013 | Nishioka | ................ | B60T 7/042 303/14 |
| 2014/0183936 A1* | 7/2014 | Kinoshita | ................ | B60T 7/122 303/20 |
| 2014/0319903 A1* | 10/2014 | Murayama | ................ | B60T 8/368 303/15 |

FOREIGN PATENT DOCUMENTS

| | | |
|---|---|---|
| CN | 2529798 Y | 1/2003 |
| CN | 2794949 Y | 7/2006 |
| EP | 1932736 A1 | 6/2008 |
| FR | 1566815 A | 5/1969 |
| JP | 2004-142602 A | 5/2004 |
| WO | 2011/083825 A1 | 7/2011 |

OTHER PUBLICATIONS

Extended European Search Report dated Jan. 22, 2016 corresponding to Application No. EP 13 76 8302.

* cited by examiner

BRAKING DEVICE

TECHNICAL FIELD

The present invention relates to a braking device that is installed, for example, in a brake system for a vehicle.

BACKGROUND ART

Conventionally, braking equipment for a vehicle is known that is provided with a master cylinder of tandem type in which one master piston and the other master piston are arranged in series in a master cylinder body with a pressurizing chamber therebetween (see, for example, Patent literature 1).

CITATION LIST

Patent Literature

Patent Literature 1: Japanese Patent Application Publication No. 2004-142602 (see FIG. 2)

SUMMARY OF INVENTION

Technical Problem

Incidentally, in order to set an initial position of the master piston, when one master piston and the other master piston are coupled by a coupling means, such as a bolt or the like, variation in a tightening torque of the bolt can occur, making assembly work troublesome and decreasing assembly accuracy. Also, an excessive load can be applied by the bolt to the master piston coupled with the bolt.

Moreover, when the bolt is provided as the coupling means, a member such as a cup is required for coupling one master piston with the other master piston and thus the number of parts is increased to increase manufacturing cost.

The present invention has been made to solve the above problems, and an object thereof is to provide a braking device that can ensure intended assembly accuracy even if assembly work is simplified, and decrease the number of parts to reduce manufacturing cost.

Solution to Problem

In order to attain the above object, the present invention provides a braking device including: a master cylinder that generates a first brake hydraulic pressure by operation of a brake operation unit; and a slave cylinder of tandem type that actuates a rod by an electric motor which is driven in response to operation amount of the brake operation unit and displaces two pistons to generate a second brake hydraulic pressure, wherein a piston on a side of the rod, of the two pistons of the slave cylinder, is a second piston, and a piston on a side opposite to the side of the rod and in a displacement direction is a first piston, and the pistons are arranged so that an inner periphery of an opening section provided in a backward side in the displacement direction of the first piston overlaps with part of one side along an axial direction of the second piston.

According to the present invention, the two pistons composed of the first piston and the second piston are arranged to overlap with each other, thereby making members such as a bolt, a cup or the like unnecessary, and making it possible to decrease the number of parts to reduce manufacturing cost. Moreover, even if assembly work is simplified, it is possible to prevent assembly accuracy from being decreased and to ensure intended assembly accuracy. Furthermore, since the two pistons are not coupled by a coupling means such as a bolt or the like, an excessive load can be avoided from being given to one piston to which a bolt is fixed.

Also, the present invention can provide a braking device, wherein a long hole extending along the axial direction of the second piston is provided on the one side of the second piston, and a regulation member that regulates a clearance between the first piston and the second piston is inserted into the long hole.

According to the present invention, the regulation member is provided on the one side of the second piston close to the first piston, thereby making it possible to prevent a tumbling motion of the second piston with the regulation member as a fulcrum point when the second piston is displaced.

Moreover, the present invention can provide a braking device, wherein an end surface of one end portion of the second piston which abuts against the first piston is formed to have a partial spherical surface.

According to the present invention, when an innermost inside wall in the opening section of the first piston and the end surface of the one end portion of the second piston abut against each other, even in the case of the second piston temporarily tilting and abutting against the first piston, a point contact is made by the partial spherical surface, thereby making it possible to suppress generation of a piston hammering sound.

Furthermore, the present invention can provide a braking device, wherein the one end portion of the second piston is provided with a tapered surface where a diameter thereof decreases toward the partial spherical surface.

According to the present invention, when the first piston and the second piston abut against each other, brake fluid is released via the tapered surface, thereby making it possible to cause the one end portion of the second piston to reliably abut against the innermost inside wall in the opening section of the first piston.

Advantageous Effects of the Invention

According to the present invention, a braking device can be obtained that allows ensuring intended assembly accuracy even if assembly work is simplified, and decreasing the number of parts to reduce manufacturing cost.

DESCRIPTION OF EMBODIMENTS

Figure 1:
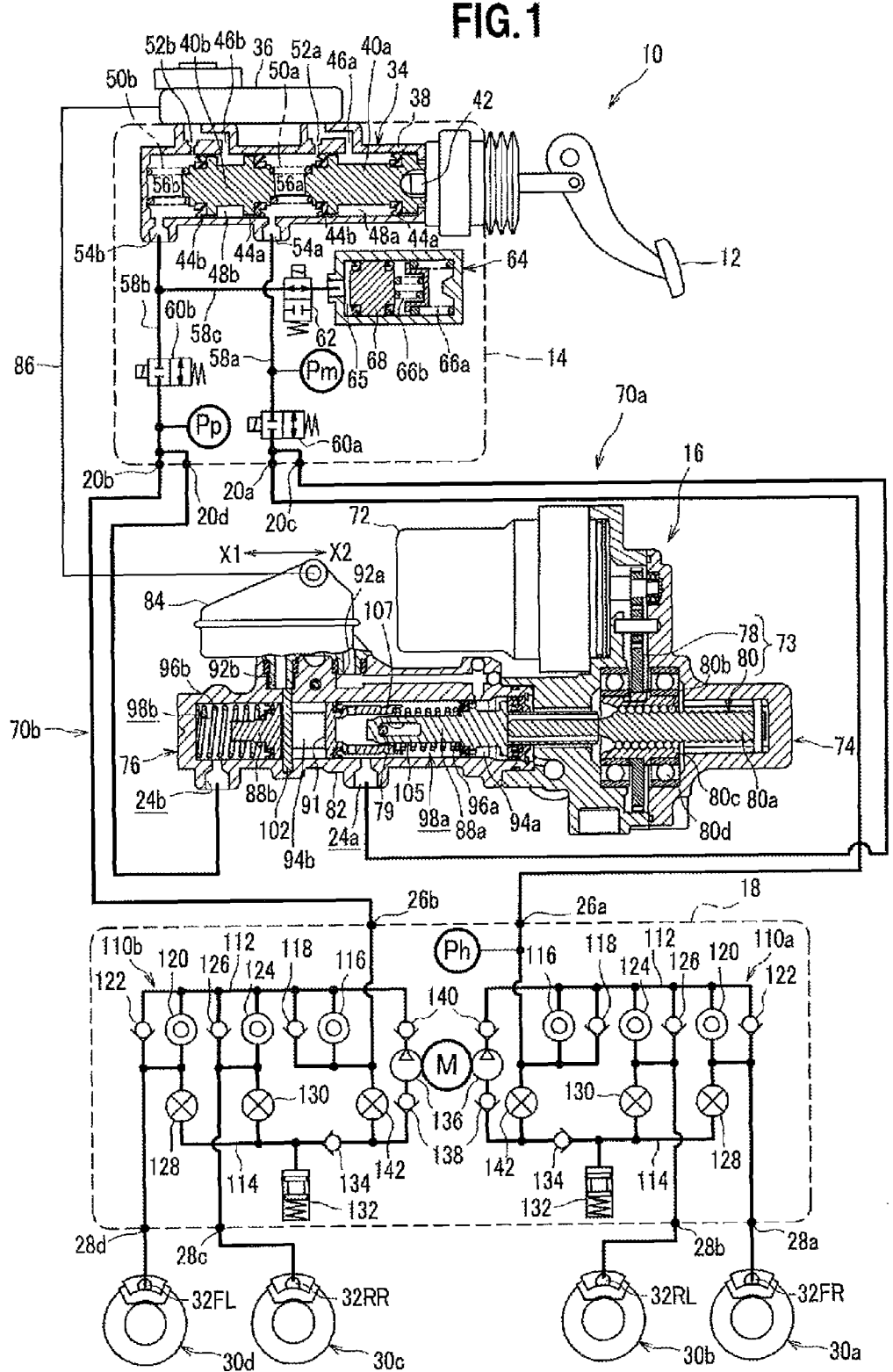
FIG. 1 is a schematic configuration diagram of a brake system for a vehicle into which a braking device according to an embodiment of the present invention is incorporated.

Hereinafter, embodiments of the present invention will be described in detail with reference to the drawings as appropriate. FIG. 1 is a schematic configuration diagram of a brake system for a vehicle into which a braking device according to an embodiment of the present invention is incorporated.

A brake system 10 for a vehicle shown in FIG. 1 is configured to include both a by-wire brake system that transmits an electric signal to actuate a brake, for normal times, and a conventional hydraulic brake system that transmits a hydraulic pressure to actuate a brake, for fail-safe.

Accordingly, as shown in FIG. 1, the brake system 10 for a vehicle is basically configured to include a master cylinder device 14 that, when a brake pedal (brake operation unit) 12 is operated by an operator, inputs the operation, a motor cylinder device 16 that controls a brake hydraulic pressure (second brake hydraulic pressure), and a fluid pressure control device 18 that assists a stability of behavior of the vehicle, as separate devices. Note that the master cylinder device 14 and the motor cylinder device 16 are united to constitute the braking device.

The master cylinder device 14, the motor cylinder device 16 and the fluid pressure control device 18 are connected with one another via a fluid pressure passage formed by a pipe material such as a hose, a tube or the like, and as the by-wire brake system, the master cylinder device 14 and the motor cylinder device 16 are electrically connected with each other via a harness (not shown).

A description will be first given of the fluid pressure passage among these. A connection port 20a of the master cylinder device 14 and a lead-in port 26a of the fluid pressure control device 18 are connected to each other via a piping tube. Moreover, another connection port 20b of the master cylinder device 14 and another lead-in port 26b of the fluid pressure control device 18 are connected to each other via a piping tube.

Moreover, a branch port 20c which communicates with the connection port 20a of the master cylinder device 14, and an output port 24a of the motor cylinder device 16 are connected to each other via a piping tube. Furthermore, a branch port 20d which communicates with the other connection port 20b of the master cylinder device 14, and another output port 24b of the motor cylinder device 16 are connected to each other via a piping tube. Note that in FIG. 1, the output ports 24a, 24b of the motor cylinder device 16 are shown at the bottom part for descriptive purposes, unlike actual positions (see FIG. 2 as described later).

The fluid pressure control device 18 is provided with a plurality of lead-out ports 28a to 28d. The first lead-out port 28a is connected via a piping tube to a wheel cylinder 32FR of a disc brake mechanism 30a which is provided on a right front wheel. The second lead-out port 28b is connected via a piping tube to a wheel cylinder 32RL of a disc brake mechanism 30b which is provided on a left rear wheel. The third lead-out port 28c is connected via a piping tube to a wheel cylinder 32RR of a disc brake mechanism 30c which is provided on a right rear wheel. The fourth lead-out port 28d is connected via a piping tube to a wheel cylinder 32FL of a disc brake mechanism 30d which is provided on a left front wheel.

In this case, brake fluid is supplied via the piping tube connected to each of the lead-out ports 28a to 28d, to each of the wheel cylinders 32FR, 32RL, 32RR, 32FL of the disc brake mechanisms 30a to 30d, and fluid pressure in each of the wheel cylinders 32FR, 32RL, 32RR, 32FL is increased, thereby actuating each of the wheel cylinders 32FR, 32RL, 32RR, 32FL and giving braking force to the corresponding wheel (right front wheel, left rear wheel, right rear wheel, left front wheel).

Note that the brake system 10 for a vehicle is provided so as to be mountable on various vehicles including, for example, a vehicle driven only by an engine (internal combustion engine), a hybrid vehicle, an electric vehicle, a fuel cell vehicle and the like.

The master cylinder device 14 includes a master cylinder 34 of tandem type that can generate a brake hydraulic pressure (first brake hydraulic pressure) by operation of the brake pedal 12 by a driver (operator), and a first reservoir 36 attached to the master cylinder 34. Two pistons 40a, 40b which are spaced at a predetermined distance from each other along an axial direction of a cylinder tube 38 of the master cylinder 34 are provided slidably in the cylinder tube 38. One piston 40a is arranged close to the brake pedal 12 and is coupled via a push rod 42 to the brake pedal 12 to be directly operated. Moreover, the other piston 40b is arranged farther away from the brake pedal 12 than the one piston 40a.

Attached to outer peripheries of the one and other pistons 40a, 40b are a pair of cup seals 44a, 44b via annular step portions, respectively. Formed between the pair of cup seals 44a, 44b are back chambers 48a, 48b which communicate with supply ports 46a, 46b as described later, respectively. Moreover, one spring member 50a is disposed between the one and other pistons 40a, 40b, and another spring member 50b is disposed between the other piston 40b and a side end portion of the cylinder tube 38. Note that the pair of cup seals 44a, 44b may be attached via annular grooves to an inside wall of the cylinder tube 38.

The cylinder tube 38 of the master cylinder 34 is provided with two supply ports 46a, 46b, two relief ports 52a, 52b, and two output ports 54a, 54b. In this case, each supply port 46a (46b) and each relief port 52a (52b) are provided to join together, respectively, and to communicate with a reservoir chamber (not shown) in the first reservoir 36.

Moreover, provided in the cylinder tube 38 of the master cylinder 34 are a first pressure chamber 56b and a second pressure chamber 56a that generate a brake hydraulic pressure associated with a pedal effort on the brake pedal 12 by the driver. The first pressure chamber 56b is provided to communicate with the connection port 20b via a first fluid pressure passage 58b, and the second pressure chamber 56a is provided to communicate with the connection port 20a via a second fluid pressure passage 58a.

A first shutoff valve 60b composed of a normally-open type solenoid valve is provided between the master cylinder 34 and the connection port 20b and in the upstream side of the first fluid pressure passage 58b, and a pressure sensor Pp is provided in the downstream side of the first fluid pressure passage 58b. The pressure sensor Pp is adapted to detect a fluid pressure in the downstream side which is closer to the wheel cylinders 32FR, 32RL, 32RR, 32FL, than the first shutoff valve 60b on the first fluid pressure passage 58b.

A pressure sensor Pm is provided between the master cylinder 34 and the connection port 20a and in the upstream side of the second fluid pressure passage 58a, and a second shutoff valve 60a composed of a normally-open type solenoid valve is provided in the downstream side of the second fluid pressure passage 58a. The pressure sensor Pm is adapted to detect a fluid pressure in the upstream side which is closer to the master cylinder 34, than the second shutoff valve 60a on the second fluid pressure passage 58a.

The "normally-open" in the first shutoff valve 60b and the second shutoff valve 60a means a valve configured so that the normal position (position of a valve element when not energized) becomes an open-position state (normally open). Note that in FIG. 1, the first shutoff valve 60b and the second shutoff valve 60a show the valve-closed state, respectively, in which the solenoid is energized to actuate the valve element (not shown).

A branch fluid pressure passage 58c branching from the first fluid pressure passage 58b is provided in the first fluid pressure passage 58b between the master cylinder 34 and the first shutoff valve 60b, and in the branch fluid pressure passage 58c, a third shutoff valve 62 composed of a normally-closed type solenoid valve, and a stroke simulator 64, are connected in series with each other. The "normally-closed" in the third shutoff valve 62 means a valve configured so that the normal position (position of a valve element when not energized) becomes a closed-position state (normally closed). Note that in FIG. 1, the third shutoff valve 62 shows the valve-open state in which the solenoid is energized to actuate the valve element (not shown).

The stroke simulator 64 is a device that generates a stroke and reaction force of the brake at the time of by-wire control to make the operator feel as if the pedal effort generates braking force, and is arranged on the first fluid pressure passage 58b, closer to the master cylinder 34 than the first shutoff valve 60b. The stroke simulator 64 is provided with a fluid pressure chamber 65 communicating with the branch fluid pressure passage 58c, thereby allowing brake fluid which is led-out from the first pressure chamber 56b of the master cylinder 34, to be absorbed via the fluid pressure chamber 65.

Moreover, the stroke simulator 64 is provided with a first return spring 66a with a greater spring constant and a second return spring 66b with a smaller spring constant which are arranged in series with each other, and a simulator piston 68 which is urged by the first and second return springs 66a, 66b, and is disposed to make a pedal feeling of the brake pedal 12 the same as in the existing master cylinder.

The fluid pressure passage is constituted, roughly classified, by a first fluid pressure system 70b that connects the first pressure chamber 56b of the master cylinder 34 with a plurality of wheel cylinders 32RR, 32FL, and a second fluid pressure system 70a that connects the second pressure chamber 56a of the master cylinder 34 with a plurality of wheel cylinders 32FR, 32RL.

The first fluid pressure system 70b includes the first fluid pressure passage 58b which connects the output port 54b of the master cylinder 34 (cylinder tube 38) in the master cylinder device 14 to the connection port 20b, the piping tube which connects the connection port 20b of the master cylinder device 14 to the lead-in port 26b of the fluid pressure control device 18, the piping tube which connects the branch port 20d of the master cylinder device 14 to the output port 24b of the motor cylinder device 16, and the piping tubes which connect the lead-out ports 28c, 28d of the fluid pressure control device 18 to the wheel cylinders 32RR, 32FL, respectively.

The second fluid pressure system 70a includes the second fluid pressure passage 58a which connects the output port 54a of the master cylinder 34 (cylinder tube 38) in the master cylinder device 14 to the connection port 20a, the piping tube which connects the connection port 20a of the master cylinder device 14 to the lead-in port 26a of the fluid pressure control device 18, the piping tube which connects the branch port 20c of the master cylinder device 14 to the output port 24a of the motor cylinder device 16, and the piping tubes which connect the lead-out ports 28a, 28b of the fluid pressure control device 18 to the wheel cylinders 32FR, 32RL, respectively.

As a result, the fluid pressure passage is constituted by the first fluid pressure system 70b and the second fluid pressure system 70a, thereby making it possible to cause the wheel cylinders 32RR, 32FL and the wheel cylinders 32FR, 32RL to operate independently, respectively, and to generate braking force independently of each other.

Figure 2:
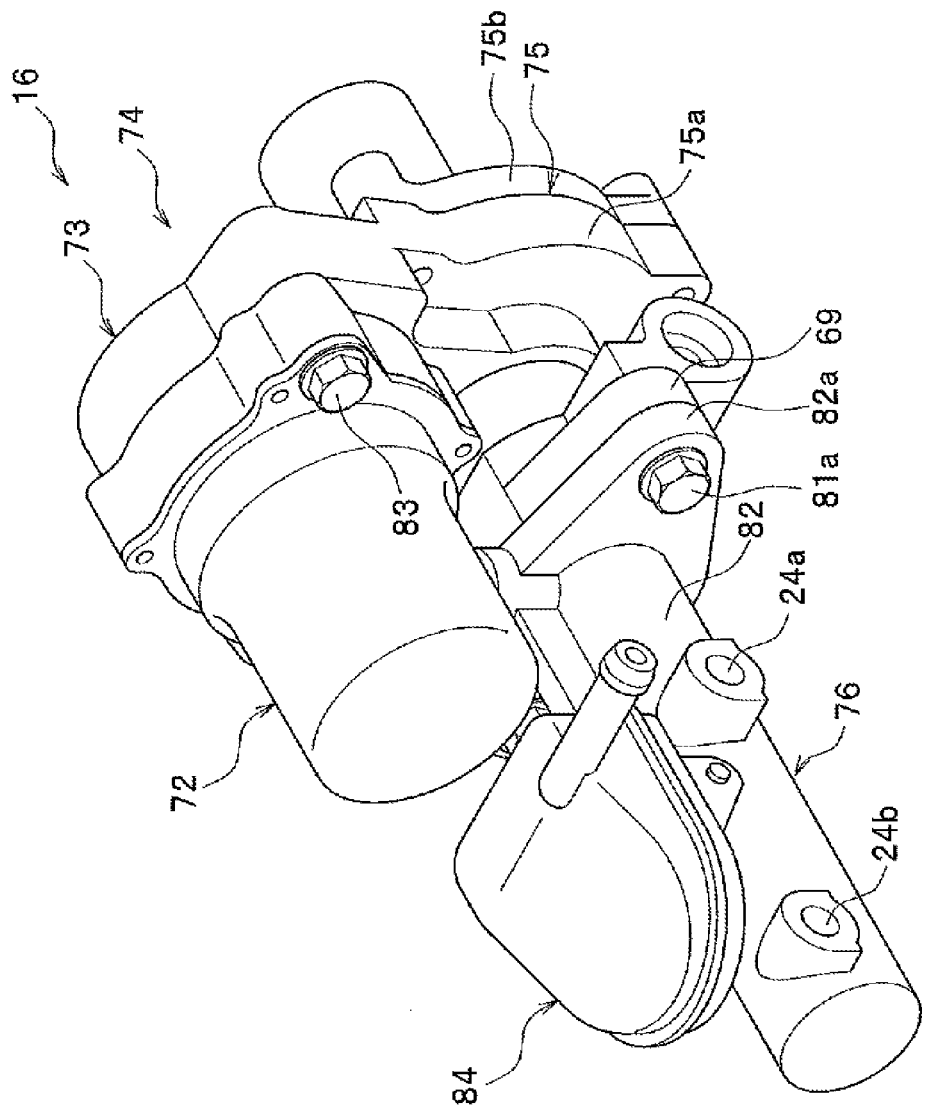
FIG. 2 is a perspective view of a motor cylinder device shown in FIG. 1.

FIG. 2 is a perspective view of the motor cylinder device shown in FIG. 1.

As shown in FIG. 2, the motor cylinder device 16 is provided with an actuator mechanism 74 having an electric motor 72 and a driving force transmission unit 73, and a cylinder mechanism 76 which is urged by the actuator mechanism 74. In this case, the electric motor 72, the driving force transmission unit 73 and the cylinder mechanism 76 are provided to be separable, respectively.

Moreover, the driving force transmission unit 73 of the actuator mechanism 74 includes a gear mechanism (speed reduction mechanism) 78 (see FIG. 1) which transmits a rotary driving force of the electric motor 72, and a ball screw structure (conversion mechanism) 80 (see FIG. 1) which converts the rotary driving force into a linear movement (axial force in the linear direction) to transmit the converted force to first and second slave pistons 88b, 88a as described later, of the cylinder mechanism 76.

The electric motor 72 is composed of, for example, a servo motor which is driven and controlled based on a control signal (electric signal) from a control unit (not shown), and is arranged above the actuator mechanism 74. With this configuration, it is possible to appropriately avoid oil constituent such as grease in the driving force transmission unit 73 from entering the electric motor 72 due to gravity action. Note that the electric motor 72 is fixed via a screw member 83 to an actuator housing 75 described below.

The driving force transmission unit 73 has the actuator housing 75, and mechanical components for driving force transmission, such as the gear mechanism (speed reduction mechanism) 78, the ball screw structure (conversion mechanism) 80 and the like, are housed in the space inside the actuator housing 75. As shown in FIG. 2, the actuator housing 75 is divided into and constituted by a first body 75a which is arranged on the side of the cylinder mechanism 76, and a second body 75b which blocks an open end of the first body 75a, on the side opposite to the cylinder mechanism 76.

As shown in FIG. 2, a flange portion 69 is provided on an end portion of the first body 75a, on the side of the cylinder mechanism 76, and the flange portion 69 is provided with a pair of screw holes (not shown) for attachment of the cylinder mechanism 76. In this case, a pair of screw members 81a, which passes through a flange portion 82a provided on an end portion of a cylinder body 82 as described later, are screwed into the screw holes, thereby integrally coupling the cylinder mechanism 76 and the driving force transmission unit 73.

As shown in FIG. 1, the ball screw structure 80 is provided with a ball screw shaft (rod) 80a which abuts at one end portion along an axial direction thereof against the second slave piston 88a of the cylinder mechanism 76, a plurality of balls 80b which roll along a spiral thread groove formed on the outer periphery of the ball screw shaft 80a, a nearly cylindrical nut member 80c which is fitted in a ring gear of the gear mechanism 78 to integrally rotate with the ring gear and is engaged with the balls 80b, and a pair of ball bearings 80d which rotatably support one end side and another end side along an axial direction of the nut member 80c, respectively. Note that the nut member 80c is fixed, for example, by press-fit, on the bore surface of the ring gear of the gear mechanism 78.

By thus configuring the driving force transmission unit 73, the rotary driving force of the electric motor 72 which is transmitted via the gear mechanism 78 is inputted to the nut member 80c and then converted by the ball screw structure 80 into the axial force in the linear direction (linear movement), thereby moving the ball screw shaft 80a forward and backward along the axial direction.

Figure 3:
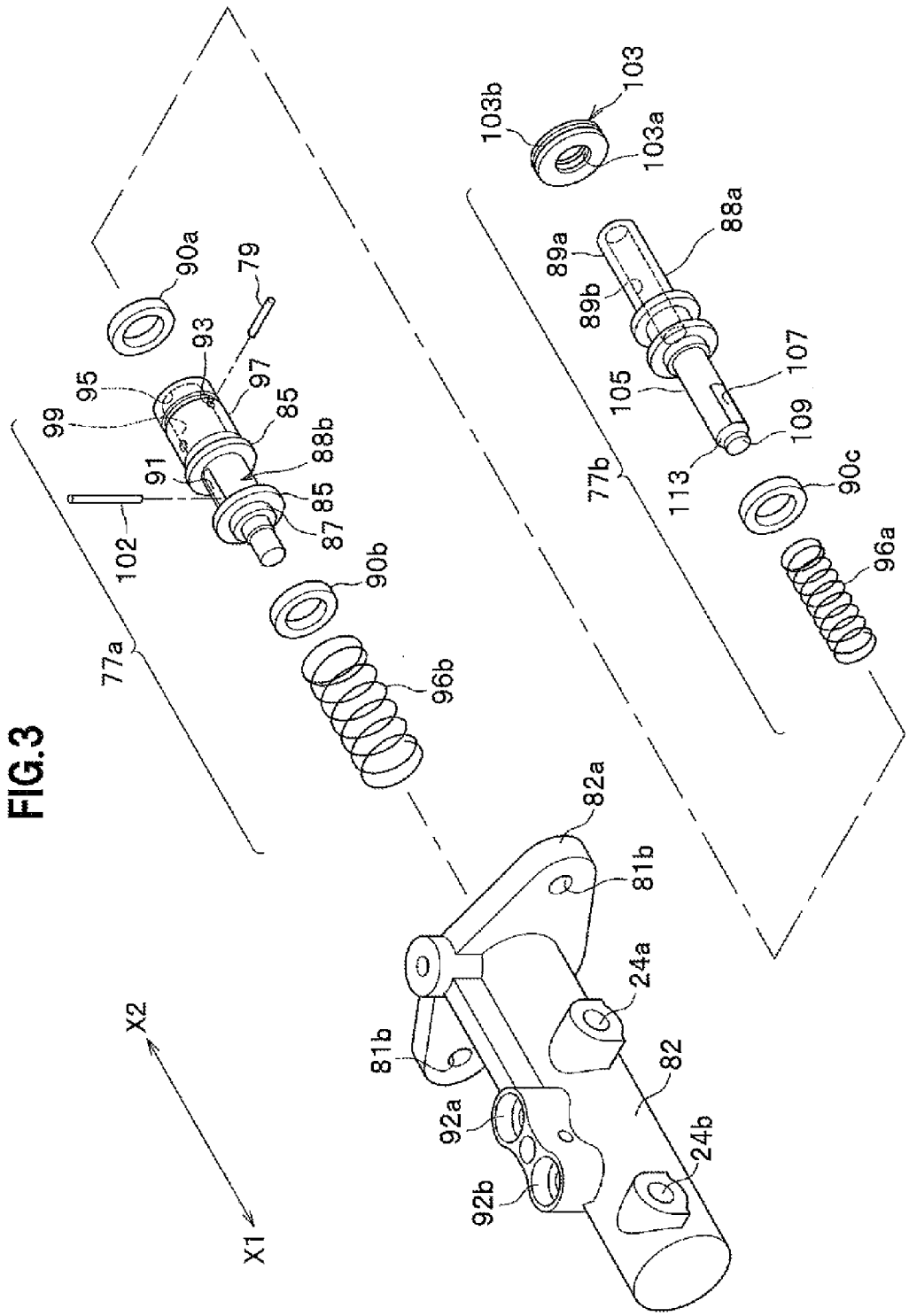
FIG. 3 is an exploded perspective view of a cylinder mechanism.
Figure 4:
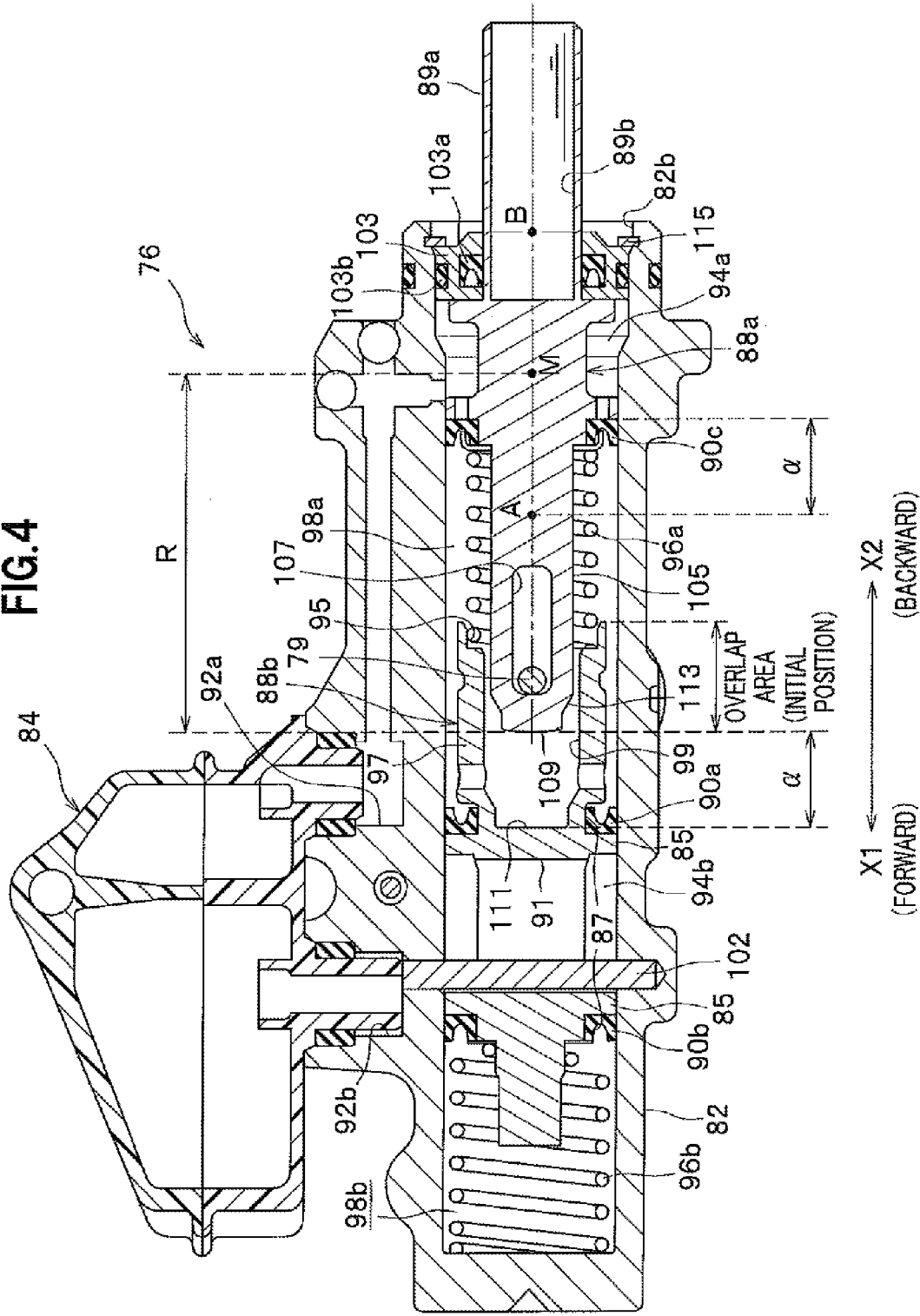
FIG. 4 is a vertical cross-sectional view along an axial direction of the cylinder mechanism.
Figure 5A:
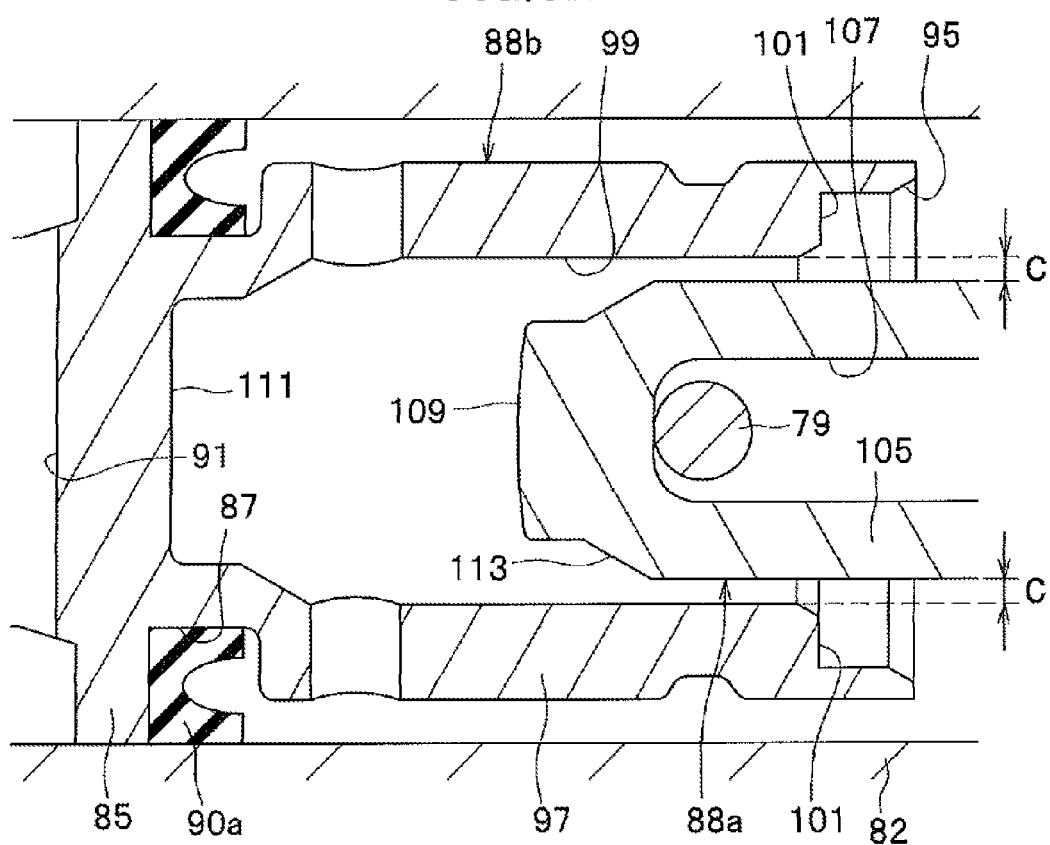
FIG. 5A is an enlarged vertical cross-sectional view showing, at an initial position, a clearance between an inner periphery of a recessed section in an opening section of a first slave piston and an outer periphery of one end portion of a second slave piston.
Figure 5B:
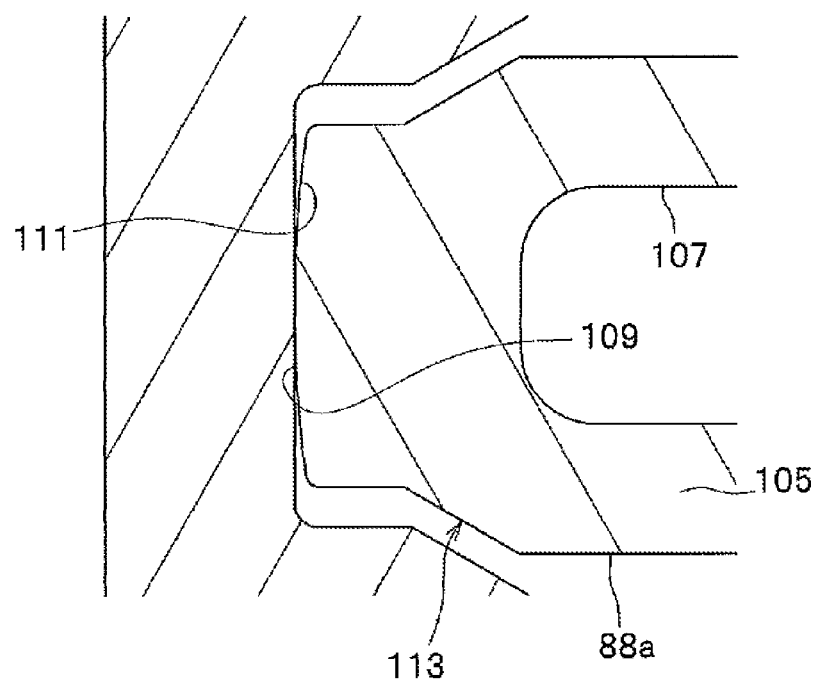
FIG. 5B is an enlarged vertical cross-sectional view showing a state in which a partial spherical surface formed on the second slave piston abuts against an innermost inside wall in the opening section of the first slave piston.

FIG. 3 is an exploded perspective view of the cylinder mechanism; FIG. 4 is a vertical cross-sectional view along the axial direction of the cylinder mechanism; FIG. 5A is an enlarged vertical cross-sectional view showing, at an initial position, a clearance between the inner periphery of a recessed section in an opening section of the first slave piston and the outer periphery of one end portion of the second slave piston; and FIG. 5B is an enlarged vertical cross-sectional view showing a state in which a partial spherical surface formed on the second slave piston abuts against an innermost inside wall in the opening section of the first slave piston.

The motor cylinder device 16 transmits the driving force of the electric motor 72 via the driving force transmission unit 73 to the first slave piston (first piston) 88b and the second slave piston (second piston) 88a of the cylinder mechanism 76 and causes the first slave piston 88b and the second slave piston 88a to be forwardly driven, thereby generating the brake hydraulic pressure (second brake hydraulic pressure). Note that in the description below, the description will be given with displacement of the first slave piston 88b and the second slave piston 88a toward the direction of an arrow mark X1, as "forward movement", and with displacement toward the direction of an arrow mark X2 as "backward movement". Moreover, in some cases, the arrow mark X1 may indicate "forward" and the arrow mark X2 may indicate "backward".

The cylinder mechanism (cylinder) 76 includes the cylinder body 82 of a cylindrical shape having a bottom, and a second reservoir 84 attached to the cylinder body 82, wherein two pistons (the first slave piston 88b and the second slave piston 88a) are arranged in tandem in series within the cylinder body 82. The second reservoir 84 is provided to be connected via a piping tube 86 to the first reservoir 36 attached to the master cylinder 34 of the master cylinder device 14, so as to supply brake fluid accumulated in the first reservoir 36 via the piping tube 86 to the second reservoir 84 (see FIG. 1).

Moreover, the cylinder mechanism 76 is provided with, as shown in FIG. 3, a first piston mechanism 77a which is constituted by assembling the first slave piston 88b and peripheral components integrally, and a second piston mechanism 77b which is constituted by assembling the second slave piston 88a and peripheral components integrally. The first piston mechanism 77a and the second piston mechanism 77b are assembled integrally and constituted so that parts thereof overlap with each other through a connection pin (regulation member) 79 as described later.

The first piston mechanism 77a includes the first slave piston 88b which is disposed toward a first fluid pressure chamber 98b in the forward of the cylinder body 82; a stopper pin 102 which is engaged with a through-hole (vertical slot) 91 formed in a middle section of the first slave piston 88b and regulates a moving range of the first slave piston 88b; a pair of cup seals 90a, 90b which abut against annular flange portions 85 in the forward and the backward of the first slave piston 88b, with the through-hole 91 therebetween, and are attached to annular step portions 87 continuing to the annular flange portions 85, respectively; and a first spring 96b which is disposed between the first slave piston 88b and a side end portion (bottom wall) of the cylinder body 82 to push the first slave piston 88b backward (direction of the arrow mark X2) inside of the cylinder body.

The cup seal 90a is a seal member which is arranged in nearly the center along the axial direction of the first slave piston 88b, to have both a seal function in sliding contact with the inside wall of the cylinder body 82, and a support function of supporting the first slave piston 88b (see FIG. 4). This point will be described in detail later.

As best shown in FIG. 4, the first slave piston 88b is formed as a hollow cylinder with an open end facing rearwardly. Provided on the backward side of the first slave piston 88b (backward side in the displacement direction) is a cylinder portion 97 with a rearwardly facing end surface having an opening section 95 formed therein of a nearly circular shape. Part of a forward end portion, along the axial direction, of the second slave piston 88a is inserted into a recessed section or cylindrical bore 99 of the cylinder portion 97, to constitute an overlap area between the first slave piston 88b and the second slave piston 88a (see FIG. 4). Moreover, formed in the cylinder portion 97 is an insertion hole 93 into which the connection pin 79 is inserted and which passes through the cylinder portion 97 in a direction perpendicular to the axial direction. Furthermore, an annular step portion 101 (see FIG. 5A) is formed on the side of the end portion of the cylinder portion 97, close to the opening section 95, and the annular step portion 101 forms a spring seat which directly bears a second spring 96a. Note that in FIG. 5A, illustration of the second spring 96a is omitted.

In this case, by arranging the stopper pin 102 and the connection pin 79 with their phases changed (approximately 90 degrees in FIG. 4), the through-hole 91 with which the stopper pin 102 is engaged, and a long hole (horizontal slot) 107 with which the connection pin 79 is engaged, differ in phase from each other. Accordingly, it is possible to suppress deterioration of strength of the first slave piston 88b and the second slave piston 88a due to the through-hole (vertical slot) 91 and the long hole (horizontal slot) 107 being arranged coaxially and linearly.

The second piston mechanism 77b includes the second slave piston 88a, which is disposed toward a second fluid pressure chamber 98a in back (direction of the arrow mark X2) of the first slave piston 88b. The second slave piston 88a includes a piston body having a pair of annular flange portions formed thereon, as shown, which are similar to the annular flange portions 85 of the first slave piston 88b, and a forward end including a shaft section 105 formed integrally with the piston body and configured to fit slidably inside the cylindrical bore 99 of the first piston. The second piston mechanism 77b also includes a guide piston 103 which seals the outer periphery of a rod portion 89a in the back end portion of the second slave piston 88a and linearly guides the second slave piston 88a; a cup seal 90c which is attached to the shaft section 105 in the forward part of the second slave piston 88a; and a second spring (elastic member) 96a which is arranged between the first slave piston 88b and the second slave piston 88a to urge the first slave piston 88b and the second slave piston 88a in the direction away from each other.

Formed in the shaft section 105 in the forward of the second slave piston 88a is the long hole 107 into which the connection pin 79 passing through the insertion hole 93 of the first slave piston 88b is inserted. The long hole 107 is formed to extend along the axial direction of the second slave piston 88a and formed to pass through the second slave piston 88a in a direction perpendicular to the axial direction. Moreover, formed inside the rod portion 89a in the backward of the second slave piston 88a is an insertion hole 89b against which one end portion of the ball screw shaft 80a abuts. The connection pin 79 which is inserted into the long hole 107 regulates a clearance between the first slave piston 88b and the second slave piston 88a and regulates the initial position of the second slave piston 88a.

As shown in FIG. 5A, a predetermined clearance C is formed between the inner periphery of the recessed section 99 in the opening section 95 of the first slave piston 88b and the outer periphery of the shaft section 105 of the second slave piston 88a a part of which is disposed inside the recessed section 99 in the opening section 95. When the second slave piston 88a is at the initial position, the clearance C is ensured by the support function of the cup seal 90a which is attached to the outer periphery of nearly the center in the axial direction of the first slave piston 88b.

Moreover, as shown in FIG. 5B, a tip surface (end surface of one end portion) of the shaft section 105 of the second slave piston 88a is formed to be a partial spherical surface 109, and abuts against an innermost inside wall 111 in the opening section 95 of the first slave piston 88b. Provided in the outer periphery of the one end portion of the shaft section 105 of the second slave piston 88a is a tapered surface 113 where the diameter gradually decreases toward the partial spherical surface 109.

Note that, the second slave piston 88a is arranged close to the ball screw structure 80 and provided to abut against the one end portion of the ball screw shaft 80a via the insertion hole 89b, so as to be displaced integrally with the ball screw shaft 80a in the direction of the arrow mark X1, or in the direction of the arrow mark X2. Moreover, the first slave piston 88b is arranged farther away from the ball screw structure 80 than the second slave piston 88a.

Formed on outer peripheries of the first and second slave pistons 88b, 88a are a first back chamber 94b and a second back chamber 94a, respectively, which communicate with reservoir ports 92a, 92b as described later, respectively (see FIG. 1).

Provided on the cylinder body 82 of the cylinder mechanism 76 are two reservoir ports 92a, 92b and two output ports 24a, 24b. In this case, the reservoir port 92a (92b) is provided to communicate with a reservoir chamber (not shown) in the second reservoir 84.

Moreover, provided in the cylinder body 82 are a first fluid pressure chamber 98b that controls a brake hydraulic pressure to be outputted from the output port 24b to the wheel cylinders 32RR, 32FL, and a second fluid pressure chamber 98a that controls a brake hydraulic pressure to be outputted from the output port 24a to the wheel cylinders 32FR, 32RL.

Provided in the first slave piston 88b is the stopper pin 102 which is engaged with the through-hole 91 passing through in the direction nearly perpendicular to the axis of the first slave piston 88b and regulates a sliding range of the first slave piston 88b to inhibit over-return to the side of the second slave piston 88a. The stopper pin 102 prevents the first fluid pressure system 70b and other systems from failing when the second fluid pressure system 70a fails, particularly at the time of backup when braking with brake hydraulic pressure generated by the master cylinder 34. Note that the stopper pin 102 is inserted from the opening section of the reservoir port 92b and locked in a locking hole formed in the cylinder body 82.

Moreover, as shown in FIG. 4, attached to an opening section 82b of the cylinder body 82 is the guide piston 103 via a circlip 115. Provided on the inner periphery of the guide piston 103 is a seal member 103a which surrounds and seals the outer periphery of the rod portion 89a of the second piston 88a, and the rod portion 89a of the second piston 88a is caused to slide along the seal member 103a, thereby making it possible to linearly guide the second piston 88a which abuts against the one end portion of the ball screw shaft 80a. Moreover, attached to the outer periphery of the guide piston 103 is a seal member 103b via an annular groove. The seal member 103b contacts with and seals the inner periphery of the opening section 82b of the cylinder body 82.

In the present embodiment, the pair of cup seals 90a, 90b are attached to the annular step portions 87 of the first slave piston 88b, respectively, to assemble the first piston mechanism 77a, and then the second slave piston 88a is inserted so that a part of the shaft section 105 thereof, to which the second spring 96a and the cup seal 90c are attached, is inserted to face inside the recessed section 99 in the opening section 95 of the first slave piston 88b.

Subsequently, while keeping the state where the part (part of one side) of the shaft section 105 of the second slave piston 88a overlaps inside the recessed section 99 in the opening section 95 of the first slave piston 88b, the connection pin 79 is inserted from the outside to pass through the insertion hole 93 of the first slave piston 88b and the long hole 107 of the second slave piston 88a, thereby making it possible to integrally assemble the first piston mechanism 77a and the second piston mechanism 77b. Note that, after a piston assembly is constructed by the first piston mechanism 77a and the second piston mechanism 77b, the guide piston 103 is coupled to the piston assembly.

Thus, in the present embodiment, since the first slave piston 88b, the second spring 96a and the second slave piston 88a can be assembled and constituted integrally and easily through the connection pin 79 which functions as the regulation member, assembly accuracy can be improved.

Referring back to FIG. 1, the fluid pressure control device 18 is composed of known components, to include a first brake system 110b that controls the first fluid pressure system 70b which is connected to the disc brake mechanisms 30c, 30d (wheel cylinders 32RR, 32FL) for the right rear wheel and the left front wheel, and a second brake system 110a that controls the second fluid pressure system 70a which is connected to the disc brake mechanisms 30a, 30b (wheel cylinders 32FR, 32RL) for the right front wheel and the left rear wheel.

Note that the second brake system 110a may be a fluid pressure system which is connected to disc brake mechanisms provided on the left front wheel and the right front wheel, and the first brake system 110b may be a fluid pressure system which is connected to disc brake mechanisms provided on the left rear wheel and the right rear wheel. Moreover, the second brake system 110a may be a fluid pressure system which is connected to disc brake mechanisms provided on the right front wheel and the right rear wheel on one side of the vehicle body, and the first brake system 110b may be a fluid pressure system which is connected to disc brake mechanisms provided on the left front wheel and the left rear wheel on another side of the vehicle body.

Since the first brake system 110b and the second brake system 110a have the same structure, respectively, the same reference sign is given to the part common to the first brake system 110b and the second brake system 110a, and description of the second brake system 110a will be mainly given and description of the first brake system 110b will be added in parentheses.

The second brake system 110a (the first brake system 110b) includes a first common fluid pressure passage 112 and a second common fluid pressure passage 114 for the wheel cylinders 32FR, 32RL (32RR, 32FL). The fluid pressure control device 18 is provided with a regulator valve 116 composed of a normally-open type solenoid valve which is arranged between the lead-in port 26a (the lead-in port 26b) and the first common fluid pressure passage 112; a first check valve 118 which is arranged in parallel with the regulator valve 116 and permits distribution of brake fluid from the lead-in port 26a (the lead-in port 26b) to the first common fluid pressure passage 112 (inhibits distribution of brake fluid from the first common fluid pressure passage 112 to the lead-in port 26a); a first in-valve 120 composed of a normally-open type solenoid valve which is arranged between the first common fluid pressure passage 112 and the first lead-out port 28a (the fourth lead-out port 28d); a second check valve 122 which is arranged in parallel with the first in-valve 120 and permits distribution of brake fluid from the first lead-out port 28*a* (the fourth lead-out port 28*d*) to the first common fluid pressure passage 112 (inhibits distribution of brake fluid from the first common fluid pressure passage 112 to the first lead-out port 28*a*); a second in-valve 124 composed of a normally-open type solenoid valve which is arranged between the first common fluid pressure passage 112 and the second lead-out port 28*b* (the third lead-out port 28*c*); and a third check valve 126 which is arranged in parallel with the second in-valve 124 and permits distribution of brake fluid from the second lead-out port 28*b* (the third lead-out port 28*c*) to the first common fluid pressure passage 112 (inhibits distribution of brake fluid from the first common fluid pressure passage 112 to the second lead-out port 28*b*).

Moreover, the fluid pressure control device 18 is provided with a first out-valve 128 composed of a normally-closed type solenoid valve which is arranged between the first lead-out port 28*a* (the fourth lead-out port 28*d*) and the second common fluid pressure passage 114; a second out-valve 130 composed of a normally-closed type solenoid valve which is arranged between the second lead-out port 28*b* (the third lead-out port 28*c*) and the second common fluid pressure passage 114; a reservoir 132 which is connected to the second common fluid pressure passage 114; a fourth check valve 134 which is arranged between the first common fluid pressure passage 112 and the second common fluid pressure passage 114 and permits distribution of brake fluid from the second common fluid pressure passage 114 to the first common fluid pressure passage 112 (inhibits distribution of brake fluid from the first common fluid pressure passage 112 to the second common fluid pressure passage 114); a pump 136 which is arranged between the fourth check valve 134 and the first common fluid pressure passage 112 and supplies the brake fluid from the second common fluid pressure passage 114 to the first common fluid pressure passage 112; a suction valve 138 and a discharge valve 140 which are provided on an inlet side and an outlet side of the pump 136; a motor M which drives the pump 136; and a suction valve 142 composed of a normally-closed type solenoid valve which is arranged between the second common fluid pressure passage 114 and the lead-in port 26*a* (the lead-in port 26*b*).

Note that in the second brake system 110*a*, provided on the fluid pressure passage close to the lead-in port 26*a* is a pressure sensor Ph adapted to detect a brake hydraulic pressure which is outputted from the output port 24*a* of the motor cylinder device 16 and controlled in the second fluid pressure chamber 98*a* of the motor cylinder device 16. Detection signals detected by each of the pressure sensors Pm, Pp, Ph are inputted to a control unit (not shown). Moreover, the fluid pressure control device 18 performs not only VSA control, but also ABS control.

The brake system 10 for a vehicle into which the braking device according to the present embodiment is incorporated is basically configured as described above, and the operation and advantageous effects thereof will be described below.

At normal times when the brake system 10 for a vehicle normally functions, the first shutoff valve 60*b* and the second shutoff valve 60*a* composed of normally-open type solenoid valves are excited by energization to be brought into the valve-closed state, and the third shutoff valve 62 composed of a normally-closed type solenoid valve is excited by energization to be brought into the valve-open state. Therefore, since the first fluid pressure system 70*b* and the second fluid pressure system 70*a* are blocked by the first shutoff valve 60*b* and the second shutoff valve 60*a*, the brake hydraulic pressure (first brake hydraulic pressure) generated by the master cylinder 34 of the master cylinder device 14 is never transmitted to the wheel cylinders 32FR, 32RL, 32RR, 32FL of the disc brake mechanisms 30*a* to 30*d*.

At this time, the brake hydraulic pressure generated in the first pressure chamber 56*b* of the master cylinder 34 is transmitted via the branch fluid pressure passage 58*c* and the third shutoff valve 62 which is in the valve-open state, to the fluid pressure chamber 65 of the stroke simulator 64. The brake hydraulic pressure supplied to the fluid pressure chamber 65 causes the simulator piston 68 to displace against spring force of the spring members 66*a*, 66*b*, thereby allowing a stroke of the brake pedal 12 and generating a pseudo pedal reaction force to give it to the brake pedal 12. As a result, a brake feeling can be obtained that is free of a sense of discomfort to the driver.

In such a state of the system, when detecting depression of the brake pedal 12 by the driver, the control unit (not shown) causes the electric motor 72 of the motor cylinder device 16 to be driven to urge the actuator mechanism 74, and causes the first slave piston 88*b* and the second slave piston 88*a* to displace (move forward) against spring forces of the first return spring 96*b* and the second return spring 96*a*, toward the direction of the arrow mark X1 in FIG. 1. By the displacements of the first slave piston 88*b* and the second slave piston 88*a*, the brake hydraulic pressures in the first fluid pressure chamber 98*b* and the second fluid pressure chamber 98*a* are pressurized so as to be balanced with each other, to generate an intended brake hydraulic pressure (second brake hydraulic pressure).

The brake hydraulic pressures in the first fluid pressure chamber 98*b* and the second fluid pressure chamber 98*a* in the motor cylinder device 16 are transmitted via the first and second in-valves 120, 124 which are in the valve-open state in the fluid pressure control device 18, to the wheel cylinders 32FR, 32RL, 32RR, 32FL of the disc brake mechanisms 30*a* to 30*d*, and the wheel cylinders 32FR, 32RL, 32RR, 32FL are actuated to give an intended braking force to each wheel.

That is to say, in the brake system 10 for a vehicle according to the present embodiment, at normal times when the motor cylinder device 16 which functions as a power fluid pressure source, an ECU (not shown) which performs a by-wire control, and the like, become operable, a so-called brake-by-wire brake system becomes active in which the disc brake mechanisms 30*a* to 30*d* (wheel cylinders 32FR, 32RL, 32RR, 32FL) are actuated with the brake hydraulic pressure (second brake hydraulic pressure) generated by the motor cylinder device 16 in the state where the first shutoff valve 60*b* and the second shutoff valve 60*a* shut off the communication between the master cylinder 34 which generates brake hydraulic pressure in response to depression of the brake pedal 12 by the driver, and the disc brake mechanisms 30*a* to 30*d* for braking each of the wheels.

On the other hand, at abnormal times when the motor cylinder device 16 and the like become inoperable, a so-called conventional hydraulic brake system becomes active in which the first shutoff valve 60*b* and the second shutoff valve 60*a* are brought into the valve-open state, respectively, and the third shutoff valve 62 is brought into the valve-closed state, and the brake hydraulic pressure (first brake hydraulic pressure) generated by the master cylinder 34 is transmitted to the disc brake mechanisms 30*a* to 30*d* (wheel cylinders 32FR, 32RL, 32RR, 32FL) to actuate the disc brake mechanisms 30*a* to 30*d* (wheel cylinders 32FR, 32RL, 32RR, 32FL).

In the present embodiment, the two pistons composed of the first slave piston 88*b* and the second slave piston 88*a* are arranged so that parts thereof overlap with each other in the axial direction, thereby making members such as a bolt, a cup or the like unnecessary, and making it possible to decrease the number of parts to reduce manufacturing cost.

Moreover, in the present embodiment, in the state where part of the shaft section 105 of the one side along the axial direction of the second slave piston 88a is inserted into the recessed section 99 in the opening section 95 of the first slave piston 88b to form the overlap area, the connection pin 79 is easily inserted into (passes through) the insertion hole 93 of the first slave piston 88b and the long hole 107 of the second slave piston 88a, thereby making it possible to simplify assemble work. Moreover, even if the assembly work is thus simplified, it is possible to prevent a decrease in assembly accuracy and to ensure intended assembly accuracy.

Note that in the present embodiment, although the connection pin 79 is used as an example of the regulation member, the regulation member is not limited to this and may be, for example, a screw member, a press-fit pin or the like (not shown), in place of the connection pin 79. Furthermore, since the two pistons composed of the first slave piston 88b and the second slave piston 88a are not coupled by a coupling means such as a bolt or the like, it is possible to appropriately avoid an excessive load being given to one piston to which a bolt is fixed.

Moreover, in the present embodiment, the regulation member composed of the connection pin 79 is provided in the shaft section 105 on the one side along the axial direction of the second slave piston 88a close to the first slave piston 88b, thereby making it possible to prevent a tumbling motion of the second slave piston 88a with the connection pin 79 as the fulcrum point when the second slave piston 88a is displaced.

Furthermore, in the present embodiment, since the cup seal 90a (seal member) attached to nearly the center of the first slave piston 88b has both the seal function and the support function of the first slave piston 88b, it is possible to prevent a tumbling motion of the first slave piston 88b. As a result, it becomes possible to ensure the predetermined clearance C between the inner periphery of the recessed section 99 in the opening section 95 of the first slave piston 88b and the outer periphery of the shaft section 105 (one end portion) of the second slave piston 88a (see FIG. 5A), and it is possible to make the overlap area between the first slave piston 88b and the second slave piston 88a contactless, except for the abutting area.

Since the predetermined clearance C is provided between the inner periphery of the first slave piston 88b and the outer periphery of the shaft section 105 (one end portion) of the second slave piston 88a, it is possible to prevent the first slave piston 88b and the second slave piston 88a from being stuck, for example, when the driver strongly depresses the brake pedal 12 to bring it into a full stroke state.

Furthermore, in the present embodiment, when the shaft section 105 of the second slave piston 88a abuts against the innermost inside wall 111 in the opening section 95 of the first slave piston 88b, even in the case of the second slave piston 88a temporarily tilting and abutting against the first slave piston 88b, a point contact is made by the partial spherical surface 109 formed on the end surface of the shaft section 105, thereby making it possible to suppress generation of a piston hammering sound.

Namely, in FIG. 4, since the partial spherical surface 109 is formed with the radius *** having the point M as the center which is the center of tilt of piston-tumbling, it is possible to push the center of the first slave piston 88b even if the second slave piston 88a tilts. Note that in FIG. 4, "α" indicates the distance to a point where the first slave piston 88b and the second slave piston 88a abut against each other. Also, the point M indicates the midpoint between the point A and the point B (line segment AM=line segment BM).

Moreover, in the present embodiment, when the first slave piston 88b and the second slave piston 88a abut against each other, the brake fluid is allowed to escape via the tapered surface 113 formed on the shaft section 105, thereby making it possible to cause the tip (partial spherical surface 109) of the shaft section of the second slave piston 88a to reliably abut against the innermost inside wall 111 in the opening section 95 of the first slave piston 88b.

Furthermore, in the present embodiment, the connection pin 79 can be easily inserted into and detached from the insertion hole 93 and the long hole 107 of the first slave piston 88b and the second slave piston 88a, respectively, thereby making it possible to easily perform maintenance work of the connection pin 79.

Note that in the present embodiment, the brake system 10 for a vehicle can be obtained that includes the motor cylinder device 16 which can generate intended brake hydraulic pressures (first and second brake hydraulic pressures) with a simple structure and thus improve assembling performance. The vehicle includes, for example, a four-wheel drive vehicle (4WD), a front-wheel drive vehicle (FF), a rear-wheel drive vehicle (FR), a motorbike, a three-wheeled vehicle and the like.

REFERENCE SIGNS LIST

12 Brake pedal (Brake operation unit)
14 Master cylinder device (Braking device)
16 Motor cylinder device (Braking device)
34 Master cylinder
72 Electric motor
79 Connection pin (Regulation member)
80a Ball screw shaft (Rod)
82 Cylinder body (Slave cylinder body)
88b First slave piston (First piston)
88a Second slave piston (Second piston)
90a Cup seal (Seal member)
95 Opening section
107 Long hole
109 Partial spherical surface
113 Tapered surface
C Clearance

The invention claimed is:
1. A braking device comprising:
a master cylinder that generates a first brake hydraulic pressure by operation of a brake operation unit; and
a slave cylinder of tandem type that actuates a rod by an electric motor which is driven in response to operation amount of the brake operation unit and displaces two pistons to generate a second brake hydraulic pressure, wherein:
a piston on a proximal side of the rod, of the two pistons of the slave cylinder, is a second piston having a piston body, and a piston spaced away from the rod in a displacement direction is a first piston having a cylindrical bore formed therein,
the second piston has a forward end formed integrally with the piston body and configured to fit slidably inside the cylindrical bore of the first piston; and
the pistons are arranged so that an inner periphery of an opening section provided in a backward side in the displacement direction of the first piston overlaps with part of one side along an axial direction of the second piston.

2. The braking device according to claim 1, wherein:
a long hole extending along the axial direction of the second piston is provided on the one side of the second piston, and
a regulation member that regulates a clearance between the first piston and the second piston is attached to the first piston and inserted into the long hole, the regulation member oriented in a direction substantially transverse to the axial direction of the second piston.

3. The braking device according to claim 1, wherein an end surface of one end portion of the second piston which abuts against the first piston is formed to have a convex shape defining a partial spherical surface.

4. The braking device according to claim 3, wherein the one end portion of the second piston is provided with a tapered surface where a diameter thereof decreases toward the partial spherical surface.

5. The braking device of claim 1, wherein the slave cylinder comprises a hollow cylinder body containing the first and second pistons, wherein the first piston has an elongated slot formed through a medial section thereof, and wherein a stopper pin attached to said cylinder body extends through the elongated slot in a direction substantially transverse to an axial direction of the first piston, the stopper pin and slot cooperating to define a moving range of the first piston.

6. A braking device comprising:
a master cylinder that generates a first brake hydraulic pressure by operation of a brake operation unit; and
a slave cylinder of tandem type that actuates a rod by an electric motor which is driven in response to operation amount of the brake operation unit and displaces two pistons to generate a second brake hydraulic pressure, the slave cylinder comprising a hollow cylinder body containing first and second pistons, wherein:
the second piston of the slave cylinder is disposed proximate the rod, and has a piston body with a cylindrical bore formed in an end portion thereof configured to receive the rod therein,
the first piston is spaced away from the rod in a displacement direction and has a body with a cylindrical bore formed therein and an elongated slot formed through a medial section thereof, and
a stopper pin attached to the cylinder body of the slave cylinder extends through the elongated slot of the first piston in a direction substantially transverse to an axial direction of the first piston, the stopper pin and slot cooperating to define a moving range of the first slave piston, and
the second piston has a forward end configured to fit slidably inside the cylindrical bore of the first piston.

7. The braking device according to claim 6, wherein the first piston has a spring seat formed therein in communication with the cylindrical bore of the first piston, said spring seat having a larger diameter than the cylindrical bore.

8. The braking device according to claim 6, wherein:
a long hole extending along the axial direction of the second piston is provided on one side of the second piston, and
a regulation member that regulates a clearance between the first piston and the second piston is attached to the first piston and inserted into the long hole, the regulation member oriented in a direction substantially transverse to the axial direction of the second piston, and also substantially transverse to the stopper pin.

9. The braking device according to claim 6, wherein an end surface of one end portion of the second piston which abuts against the first piston is formed to have a convex shape defining a partial spherical surface.

10. The braking device according to claim 9, wherein the one end portion of the second piston is provided with a tapered surface where a diameter thereof decreases toward the partial spherical surface.

11. The braking device according to claim 6, wherein the first piston has a spring seat formed therein in communication with the cylindrical bore of the first piston, said spring seat having a larger diameter than the cylindrical bore.

* * * * *